United States Patent
Abe

(10) Patent No.: US 6,693,675 B1
(45) Date of Patent: Feb. 17, 2004

(54) IMAGE READING DEVICE

(75) Inventor: Tetsuya Abe, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/433,319

(22) Filed: Nov. 4, 1999

(30) Foreign Application Priority Data

Nov. 9, 1998 (JP) .......................................... P10-317380

(51) Int. Cl.[7] .......................... H04N 5/225; H04N 5/253
(52) U.S. Cl. .......................... 348/373; 348/375; 348/96; 348/207.99
(58) Field of Search ................................. 348/373, 371, 348/374, 375, 262, 261, 207, 99, 96, 209.99; 358/474; 396/429

(56) References Cited

U.S. PATENT DOCUMENTS 6,023,590 A * 2/2000 Abe et al. .................... 396/429
6,404,514 B1 * 6/2002 Yamamoto .................... 358/474
6,456,319 B1 * 9/2002 Hirasawa et al. .............. 348/96
6,556,237 B1 * 4/2003 Fredlund et al. .............. 348/96
2002/0071028 A1 * 6/2002 Ezawa .......................... 348/96

* cited by examiner

Primary Examiner—Aung S. Moe
(74) Attorney, Agent, or Firm—Greenblum & Bernstein, P.L.C.

(57) ABSTRACT

The image reading device comprises a housing in which a read object set portion, a light source set portion and an image sensor set portion are provided. A film, in which an image is recorded, is inserted in the read object set portion. An electronic flash is detachably attached to the light source set portion. A digital camera is detachably attached to the image sensor set portion. In the housing, a photographing lens of the digital camera faces the film, which is illuminated by the light source, so that the image is read by the digital camera. When the digital camera is detached from the image sensor set portion, the electronic flash is attached to the digital camera for illuminating a subject to be photographed.

8 Claims, 5 Drawing Sheets

IMAGE READING DEVICE

BACKGROUND OF THE INVENTION

1. Field of the Invention

The present invention relates to an image reading device by which an image, recorded in a film, for example, is read.

2. Description of the Related Art

Conventionally, there is known an image reading device which directly reads an image, recorded in a film, so that the image is processed in a personal computer or is indicated by a television set. In the image reading device, an area sensor or a two-dimensional image sensor can be provided, so that the image is read or sensed at a high speed.

On the other hand, there is known an image reading device, in which the two-dimensional image sensor can be removed from the image reading device, so that the two-dimensional image sensor can be used as a digital camera. In the image reading device, a light source is provided for illuminating a read object in which the image is recorded, while another light source, for illuminating a subject to be photographed by the digital camera, is provided for attaching to the digital camera when it is removed from the image reading device. Therefore, the construction of the system, of the image reading device provided with two light sources, is complicated and the cost thereof is expensive.

SUMMARY OF THE INVENTION

Therefore, an object of the present invention is to provide an image reading device in which the construction is simple and the cost is low.

According to the present invention, there is provided an image reading device comprising a light source, an image sensor and a housing.

The light source illuminates a read object. The image sensor senses an image recorded in the read object. The housing has a read object set portion, to which the read object is attached, a light source set portion, to which the light source is detachably attached, and an image sensor set portion to which the image sensor is detachably attached. The image sensor can be used as a digital camera when removed from the image sensor set portion, and the light source being able to be attached to the image sensor when the image sensor is removed from the image sensor set portion.

Further, according to the present invention, there is provided an image reading device comprising a digital camera, a light source and a housing.

The digital camera that senses an image recorded in a film. The light source illuminates the film. The housing has a read object set portion, to which the film is attached, a light source set portion, to which the light source is detachably attached, and an image sensor set portion to which the digital camera is detachably attached. The light source can be attached to the digital camera when the digital camera is removed from the image sensor set portion.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
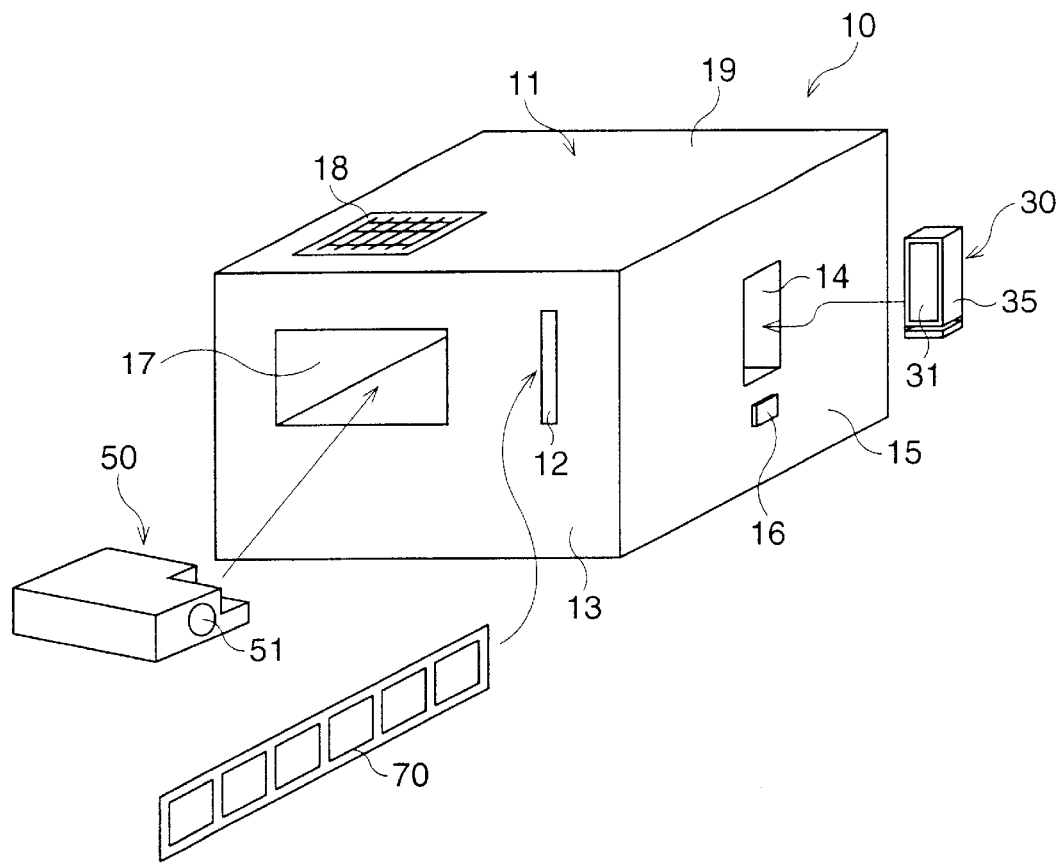
FIG. 1 is a perspective view showing an image reading device of an embodiment of the present invention, in a disassembled state.

The present invention will be described below with reference to embodiments shown in the drawings.

FIG. 1 shows an image reading device 10 of an embodiment of the present invention, in which a light source 30 and an image sensor 50 are disassembled from a housing 11 of the image reading device 10.

The housing 11 has a read object set portion 12, to which a read object 70, in which an image is recorded, is attached. The read object set portion 12 is an opening formed in a first side wall 13 of the housing 11. The housing 11 has a light source set portion 14, to which the light source 30 is detachably attached. The light source set portion 14 is an opening formed in a second side wall 15 which is adjacent to the first side wall 13, and the light source 30 is inserted into the light source opening. The housing 11 has an image sensor set portion 17, to which the image sensor 50 is detachably attached. The image sensor set portion 17 is an opening formed in the first side wall 13. The image sensor 50 senses an two-dimensional image instantaneously, and can be used as a digital camera.

A light source eject button 16 is disposed adjacent to the light source set portion 14 so that the light source 30, which is attached to the light source set portion 14, can be removed therefrom. An operating unit 18 is provided on an upper wall 19 of the housing 11. The image reading device 10 is operated through the operating unit 18.

Figure 2:
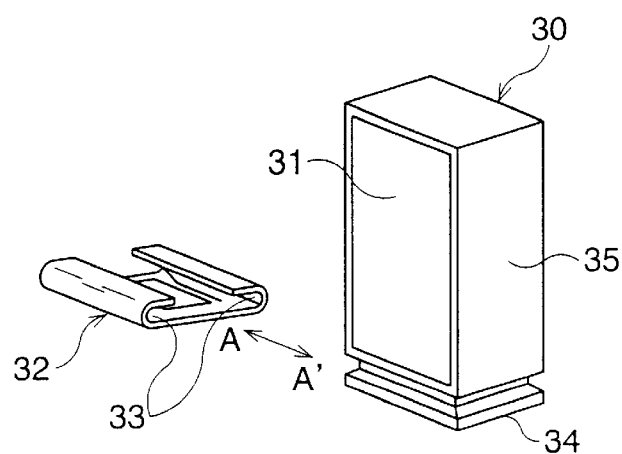
FIG. 2 is a perspective view showing a light source and a contact metal to which the light source is attached.

The light source 30 is an electronic flash. As shown in FIG. 2, the light source 30 has a rectangular radiation surface 31 from which an illumination light beam is radiated. A light source contact metal 32 is disposed in the light source set portion 14. The light source contact metal 32 is a metal plate, having two end portions which are bent to form engaging grooves 33. The light source 30 has a projection 34 at an end portion of the light source 30, and the projection 34 can be slidably fit in the engaging grooves 33 in the A–A' direction, so that the light source 30 is engaged with the light source contact metal 32. Thus, the light source 30 is attached to the light source set portion 14, and in the attaching condition, a side surface 35 adjacent to the radiation surface 31 is exposed in the second side wall 15 of the housing 11.

Figure 3:
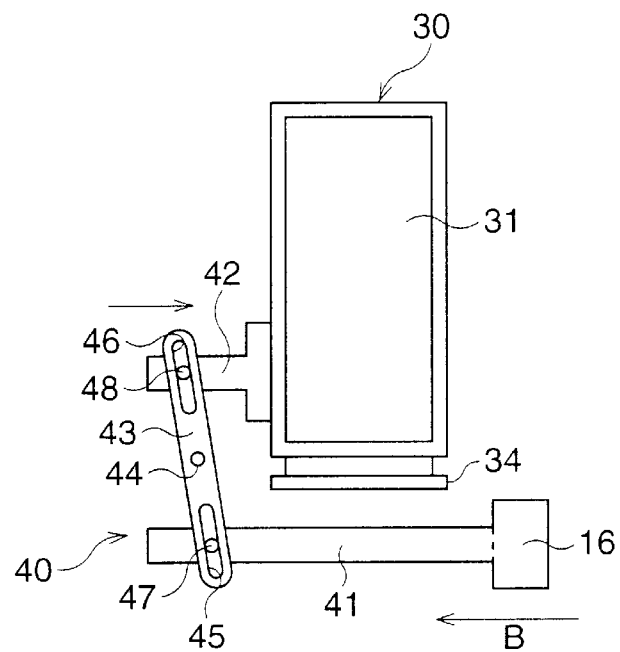
FIG. 3 is a view showing an ejecting mechanism by which the light source is ejected from the image reading device.

FIG. 3 shows an ejecting mechanism 40 by which the light source 30 can be ejected from the housing 11. The ejecting mechanism 40 has the light source eject button 16, which is connected to an eject bar 41, and a push bar 42, against which the light source 30 is abutted when set in the light source set portion 14. A swing lever 43 is pivoted by a pin 44, and has slots 45 and 46, in which pins 47 and 48, provided to the eject bar 41 and push bar 42, are engaged. Thus, when the light source eject button 16 is pushed in a direction B, the swing lever 43 is rotated, so that the push bar 42 is moved in a direction opposite to the direction B, and thus, the light source 30 is disconnected from the light source contact metal 32, and ejected from the housing 11.

Figure 4:
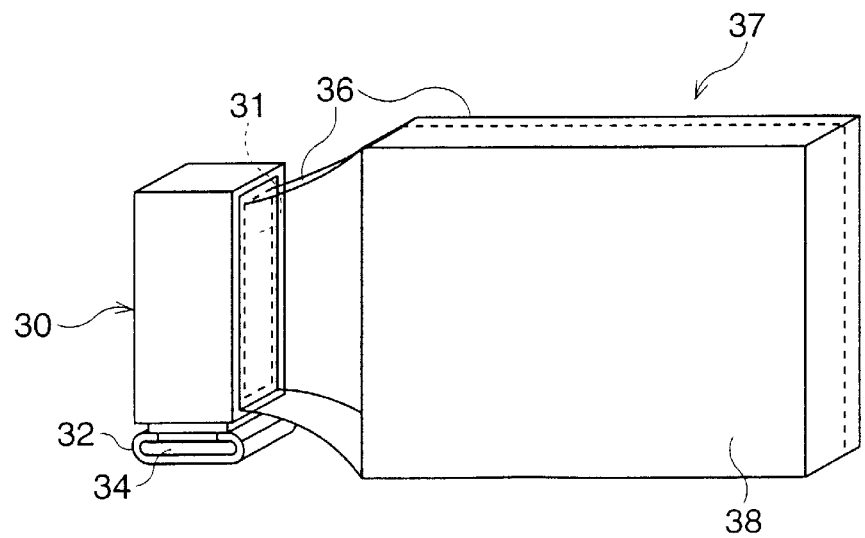
FIG. 4 is a perspective view showing the light source and an illumination unit.

The radiation surface 31 is extended along the direction B in which the light source 30 is inserted into the light source set portion 14. Namely, the light source 30 is attached to the light source set portion 14 in such a manner that the radiation surface 31 is set in perpendicular to the second side wall 15. As shown in FIG. 4, a reflecting plate 36 is connected to the radiation surface 31, and an illumination unit 37 is connected to the reflecting plate 36. The illumination unit 37 has a light guide member 38 which is extended in a plane which is perpendicular to the radiation surface 31. The read object 70 (see FIG. 1) is attached to the read object set portion 12 in such a manner that the read object 70 faces the light guide member 38.

The read object 70 is a film. The image recorded in the film 70 is illuminated by the light source 30, so that the image is read by the image sensor 50 or the digital camera which is set to the image sensor set portion 17.

When the digital camera 50 is attached to the image sensor set portion 17, a photographing lens 51 of the digital camera 50 faces the read object 70, attached to the read object set portion 12, and is positioned on a straight line which passes through the center of the light guide member 38. A light cut member is provided so that ambient light, which is other than a light beam output by the illumination unit 37, is prevented from entering the photographing lens 51. Namely, the image reading device 10 is constructed in such a manner that the read object 70 is not affected by a scattered light, generated by a light beam from outside of the image reading device 10, so that a clear image can be sensed by the digital camera 50. The image is sensed by an area sensor 52 or a two-dimensional CCD provided in an imaging device 53.

Figure 5:
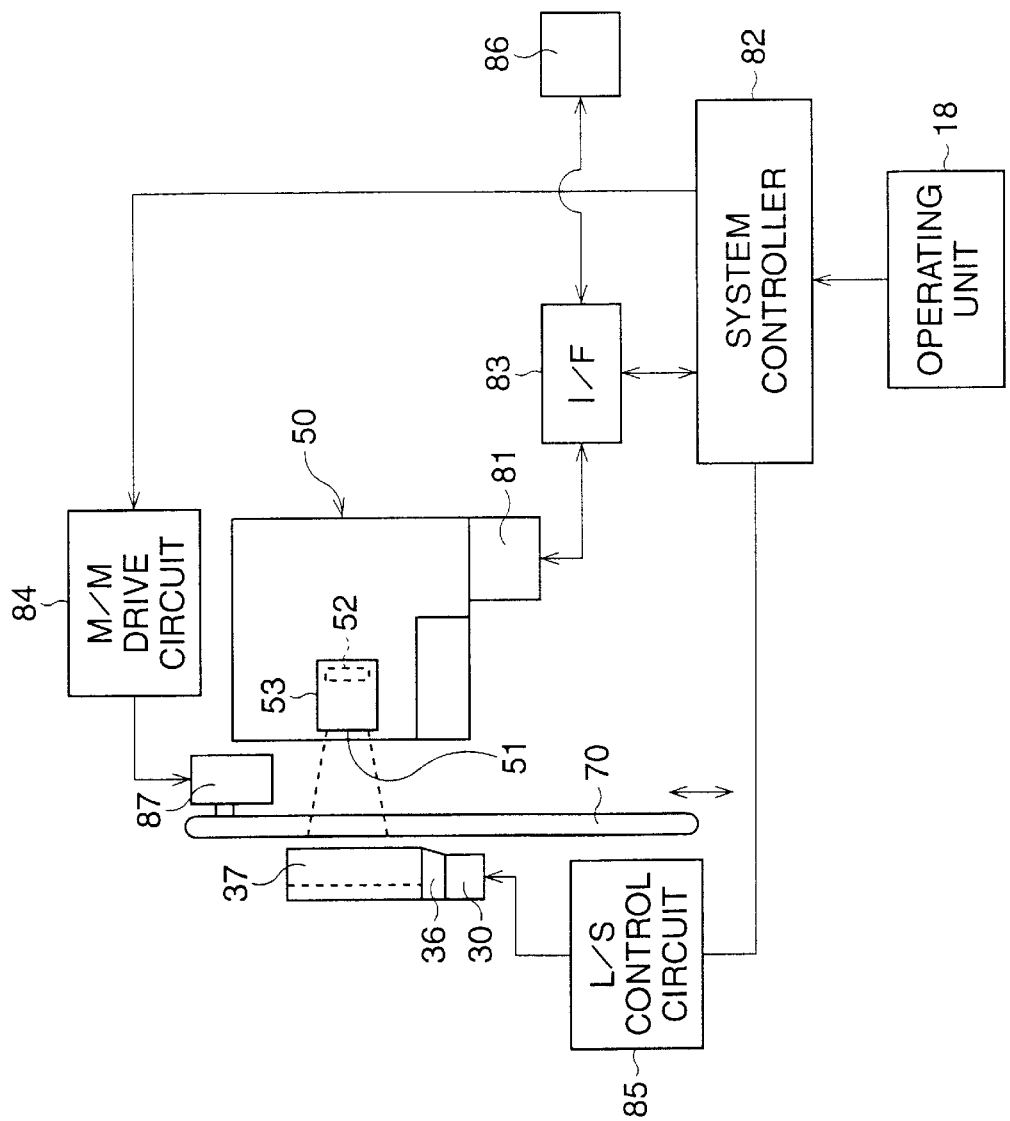
FIG. 5 is a block diagram showing an electric circuit of the image reading device.

FIG. 5 shows an electric circuit of the image reading device 10. When the digital camera 50 is set to the image sensor set portion 17, the digital camera 50 is electrically connected to an input/output terminal 81 mounted in the housing 11. The input/output terminal 81 is connected to a system controller 82 through an interface circuit 83.

The system controller 82 is connected to the operating unit 18, the interface circuit 83, a moving mechanism drive circuit 84 and a light source control circuit 85. The digital camera 50, attached to the image sensor set portion 17, is controlled by the interface circuit 83. The read object 70, set to the read object set portion 12, is moved under control of the moving mechanism drive circuit 84. A light beam irradiation of the light source 30 is controlled by the light source control circuit 85. Thus, the reading operation of the image recorded in the read object 70, the moving operation of the read object 70 and the radiation of the light source 30, are controlled through the system controller 82.

The interface circuit 83 is connected to an input/output terminal 86, in addition to the system controller 82 and the input/output terminal 81, so that signals are input and output through the terminals 81 and 86.

When the digital camera 50 is connected to the input/output terminal 81, the connection is sensed by the interface circuit 83, so that a connection signal is transmitted to the system controller 82. Thus, it is determined by the system controller 82 that a reading operation of the image, recorded in the read object 70, can be performed.

When the reading operation is to be performed by the imaging device 53, a start signal is transmitted from the system controller 82 to the interface circuit 83. Based on the start signal, the imaging device 53 is controlled by the interface circuit 83 to carry out the reading operation.

The image, read by the imaging device 53, is recorded in a recording medium mounted in the digital camera 50, and also can be output to an external device through the input/output terminal 86. This output is controlled by the interface circuit 83 based on a signal output by the system controller 82.

A moving mechanism 87, provided in the housing 11, is controlled by the moving mechanism drive circuit 84, based on a signal output by the system controller 82, so that the read object 70, for which the reading operation is to be performed, is moved to face the photographing lens 51 of the digital camera 50.

Figure 6:
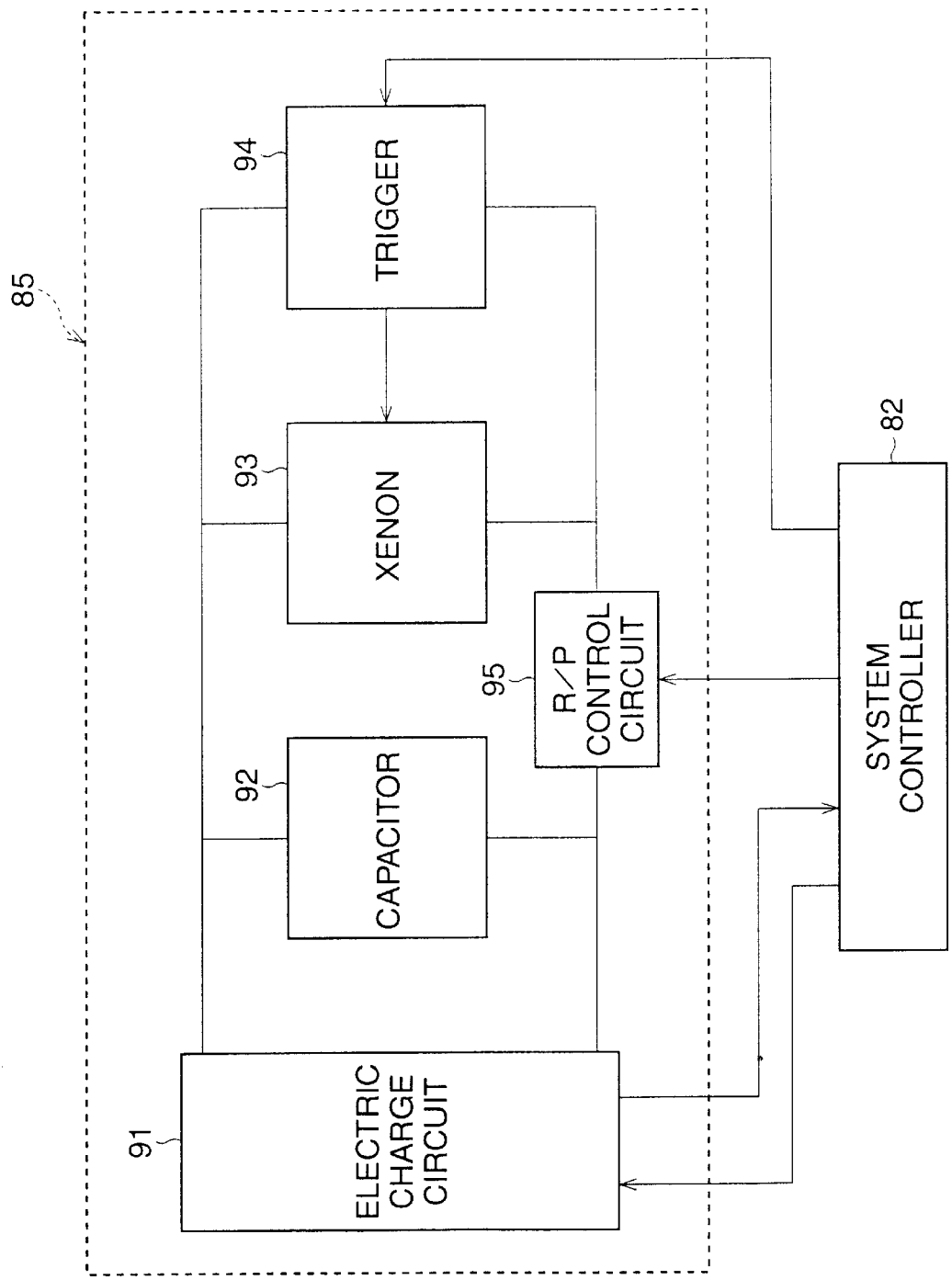
FIG. 6 is a block diagram showing a circuit provided in a light source control circuit.

FIG. 6 shows a circuit provided in the light source control circuit 85, which is provided with an electric charge circuit 91, a capacitor 92, a xenon lamp 93, a trigger circuit 94 and a radiation period control circuit 95.

When a charge start signal is transmitted from the system controller 82 to the electric charge circuit 91, the electric charge circuit 91 begins to accumulate electric charges in the capacitor 92, so that the xenon lamp 93 of the light source 30 or the electronic flash can irradiate flash light.

When the accumulation of electric charge is completed, a charge completion signal is transmitted from the electric charge circuit 91 to the system controller 82, so that it is determined by the system controller 82 that the light source 30 has become able to radiate a flash light.

When a trigger signal is transmitted from the system controller 82 to the trigger circuit 94, the electric charge which is accumulated in the capacitor 92 is transferred to the xenon lamp 93, so that the light source 30 radiates. At this time, if the radiation period of the xenon lamp 93 is manually or automatically set, a stop signal is transmitted from the system controller 82 to the radiation period control circuit 95 when a predetermined time has passed. Thus, an electric supply to the radiation period control circuit 95 is stopped, so that the radiation of the xenon lamp 93 is stopped. Thus, the radiation period of the light source 30 is controlled.

The control of the system controller 82 is performed through the operating unit 18 connected to the system controller 82, and by handling only the operating unit 18, all of the operations including the reading operation of the image recorded in the read object 70, the moving of the read object 70, the radiation of the light source 30, and so on, can be performed.

Figure 7:
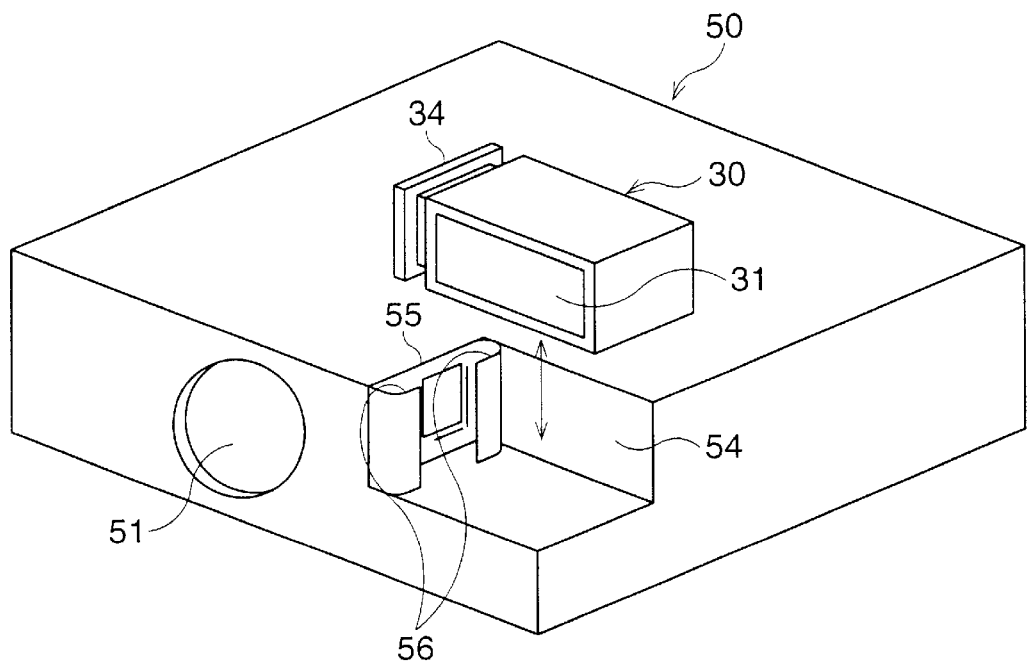
FIG. 7 is a perspective view showing the light source and a digital camera in a disassembled state.

As shown in FIG. 7, in the digital camera 50, an attaching portion 54, to which the light source 30 can be attached, is formed on a corner beside the photographing lens 51. An image sensor contact metal 55, which has the same construction as the light source contact metal 32 which is provided in the light source set portion 14 is provided in the attaching portion 54. Namely, the light source 30, which is removed from the housing 11, is detachably attached to the digital camera 50 by an operator in such a manner that the radiation surface 31 is directed to the same direction as the photographing lens 51 and the projection 34 is slidably engaged in engaging grooves 56. The light source 30 attached to the digital camera 50 is electrically connected to the digital camera 50, so that the light source 30 can be used as an electronic flash for a photographing operation.

The light source 30 can be used as an illumination light source for a silver halide camera, in addition to an illumination light source for the digital camera 50.

As described above, in the image reading device 10 of the embodiment, the light source 30, which is used for illuminating the read object, is removed from the housing 11, and can be used as an illumination light source when the image sensor 50 is used as a digital camera, which is separated from the housing 11. Therefore, a plurality of light sources need not be provided for the image reading device 10 and the digital camera 50, as the light source 30 is conveniently usable in various applications, and thus the cost of the image reading device 10 is reduced.

Further, in the embodiment, the read object 70 is not directly illuminated by the light source 30, but is illuminated by light, spread by the illumination unit 37 to cover the read object 70. Therefore, in spite of the light source 30 or the electronic flash, not usually being suitable for widely illuminating an object, the whole of a light receiving surface of the read object can be uniformly illuminated.

Furthermore, in the embodiment, the light source 30 can be easily removed from the housing 11 through the opening of the light source set portion 14. Therefore, when a failure such as a breaking of a wire occurs in the light source 30, a new light source is easily substituted.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 10-317380 (filed on Nov. 9, 1998) which is expressly incorporated herein, by reference, in its entirety.

What is claimed is:

1. An image reading device comprising:

a light source that illuminates a read object;

an image sensor that senses an image recorded in said read object; and a housing having a read object set portion, to which said read object is attached, a light source set portion, to which said light source is detachably attached, and an image sensor set portion to which said image sensor is detachably attached;

said image sensor being able to be used as a digital camera when removed from said image sensor set portion, and said light source being able to be attached to said image sensor when said image sensor is removed from said image sensor set portion.

2. A device according to claim 1, wherein said image is two-dimensional, and said image sensor comprises an area sensor sensing said image.

3. A device according to claim 1, wherein said image sensor comprises an attaching portion, to which said light source is attached, and which has an image sensor contact metal, through which said light source is electrically connected to said image sensor.

4. A device according to claim 1, wherein said light source set portion is provided with a light source contact metal, which is connected to said light source so that said light source illuminates said read object.

5. A device according to claim 1, wherein said light source comprises an electronic flash.

6. A device according to claim 1, wherein said housing has a wall in which an opening is formed, through which said light source is inserted into and removed from said housing.

7. A device according to claim 1, further comprising an illumination unit spreading light radiated by said light source to uniformly illuminate the whole light receiving surface of said read object.

8. An image reading device comprising:

a digital camera that senses an image recorded in a film;

a light source that illuminates said film; and a housing having a read object set portion, to which said film is attached, a light source set portion, to which said light source is detachably attached, and an image sensor set portion to which said digital camera is detachably attached;

said light source being able to be attached to said digital camera when said digital camera is removed from said image sensor set portion.

\* \* \* \* \*